United States Patent
Chang et al.

(10) Patent No.: US 10,144,179 B2
(45) Date of Patent: Dec. 4, 2018

(54) AUTOMATED TREATMENT PROCESS AND APPARATUS

(71) Applicant: FORD GLOBAL TECHNOLOGIES, LLC, Dearborn, MI (US)

(72) Inventors: Tsunou Chang, Billericay (GB); Jonathan Richard Bishop, Loughton (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 131 days.

(21) Appl. No.: 15/215,850

(22) Filed: Jul. 21, 2016

(65) Prior Publication Data

US 2017/0021559 A1 Jan. 26, 2017

(30) Foreign Application Priority Data

Jul. 21, 2015 (GB) .................................. 1512857.2

(51) Int. Cl.
*B60P 3/00* (2006.01)
*B29C 65/48* (2006.01)
(Continued)

(52) U.S. Cl.
CPC ............ *B29C 65/48* (2013.01); *B05C 5/0212* (2013.01); *B05C 5/0216* (2013.01);
(Continued)

(58) Field of Classification Search
CPC .... F02F 7/0095; F02F 11/002; F01M 11/004; F01M 2011/0062; B29C 65/48; B29L 2031/26; B05C 5/0212; B05C 5/0216
(Continued)

(56) References Cited

U.S. PATENT DOCUMENTS

| 6,228,168 B1 | 5/2001 | Johnson |
| 6,431,549 B1* | 8/2002 | Hill ........................ B05C 5/0216 156/295 |

(Continued)

FOREIGN PATENT DOCUMENTS

| EP | 2837430 A2 | 6/2014 |
| JP | 1983179894 A | 9/1983 |
| JP | 1991358271 A | 12/1991 |

OTHER PUBLICATIONS

Henkel KGaA, Henkel Powertrain Technologies product information, available at URL http://www.loctite.ph/php/content_data/LT4339_TT_Automotive_Powertrain_Brochure.pdf.
(Continued)

*Primary Examiner* — Marguerite McMahon
(74) *Attorney, Agent, or Firm* — Burris Law, PLLC

(57) ABSTRACT

An automated sealing process (100) for sealing a casing, the casing comprising a first casing portion (107) having a first sealing surface (115), and a second casing portion having a second sealing surface configured to engage the first sealing surface (115), the first casing portion (107) being assembled from at least two components such that the first sealing surface (115) comprises a joint (100) between the components, the process (100) comprising: applying a surface treatment to the joint (117) of the first sealing surface (115) using an automated treatment apparatus (101); and applying a sealant to at least one of the first sealing surface (115) and the second sealing surface prior to bringing the first and second sealing surfaces into engagement.

24 Claims, 5 Drawing Sheets

(51) Int. Cl.
    *F16J 15/14*     (2006.01)
    *B05C 5/02*     (2006.01)
    *F01M 11/00*     (2006.01)
    *F02F 7/00*     (2006.01)
    *F02F 11/00*     (2006.01)
    *B29L 31/26*     (2006.01)

(52) U.S. Cl.
    CPC ....... *F01M 11/0004* (2013.01); *F02F 7/0095* (2013.01); *F02F 11/002* (2013.01); *F16J 15/14* (2013.01); *B29L 2031/26* (2013.01); *F01M 2011/0062* (2013.01)

(58) Field of Classification Search
    USPC .......................................... 123/193.3, 195 C
    See application file for complete search history.

(56) References Cited

U.S. PATENT DOCUMENTS

| | | | | |
|---|---|---|---|---|
| 7,574,990 | B2* | 8/2009 | Dewald | F16J 15/064 123/195 C |
| 2003/0044553 | A1* | 3/2003 | Ramanathan | B29C 65/72 428/35.8 |
| 2004/0186201 | A1* | 9/2004 | Stoffer | C09C 1/56 523/215 |
| 2006/0172081 | A1 | 8/2006 | Flinn et al. | |
| 2011/0183137 | A1* | 7/2011 | Spraggon | C08G 77/24 428/336 |
| 2012/0043009 | A1* | 2/2012 | Niermann | B05C 11/1021 156/64 |
| 2014/0212581 | A1* | 7/2014 | Nichols | B05C 9/10 427/207.1 |
| 2014/0319829 | A1* | 10/2014 | Halla | F01M 11/0004 285/368 |
| 2015/0017345 | A1 | 1/2015 | Candela et al. | |

OTHER PUBLICATIONS

Ellsworth Adhesives, YouTube Video, Dots Video—SD-900 Automated Inline Adhesive Dispensing System, published Sep. 23, 2011, available at URL https://www.youtube.com/watch?v=ukdJlehriX4.
Henkel Corporation, Henkel Industrial Solutions Surface Treatment Selector Guide, available at URL www.henkelna.com/industrial.
Henkel PDC Egypt, Application Technologies, 2018, available at URL http://en-imea.henkel-adhesives.com/industrial/2709_HME_HTML.htm.

* cited by examiner

AUTOMATED TREATMENT PROCESS AND APPARATUS

CROSS REFERENCE TO RELATED APPLICATIONS

This application claims foreign priority benefits under 35 U.S.C. § 119(a)-(d) to UK1512857.2, filed Jul. 21, 2015, which is hereby incorporated by reference in its entirety.

TECHNICAL FIELD

This disclosure relates to an automated treatment process for sealing a casing, and in particular, but not exclusively, relates to an automated sealing process for applying a surface treatment to a sealing surface of a casing.

BACKGROUND

In many applications, it is necessary to seal a casing, for example an engine casing, such that fluids do not leak out of the casing. It may also be desirable to prevent contaminants, such as water and dirt, from getting inside the casing.

There are many ways in which a casing may be sealed, but it is common to use a "formed-in-place" sealant such as RTV to help seal between appropriate sealing surfaces of different portions of the casing.

One of the difficulties in sealing an engine casing is that the different portions of the engine casing may be made from different materials, and may therefore expand by different amounts during operation of the engine owing to differing coefficients of thermal expansion. As a result of the differing amounts of expansion, the sealant may become de-bonded from one of the sealing surfaces, which allows engine oil to leak from the casing.

It is known to clean one or more of the sealing surfaces using a cleaning fluid before applying the sealant and assembling the engine casing. However, such measures may not be sufficient to prevent the sealant from de-bonding during operation of the engine.

SUMMARY

According to an aspect of the present invention there is provided an automated treatment process, e.g. a sealing process for sealing a casing. The casing may an engine casing. The automated treatment process may be configured to seal the interface between different portions of the engine casing. The casing comprises a first casing portion having a first sealing surface. The casing comprises a second casing portion having a second sealing surface. The first sealing surface and the second sealing surface are configured to engage each other. The first casing portion is assembled from at least two components. The first sealing surface comprises a joint between the components of the first casing portion. The process comprises a step of applying a surface treatment to the joint of the first sealing surface using an automated treatment apparatus. The process may comprise a step of applying a sealant to at least one of the first sealing surface and the second sealing surface prior to bringing the first and second sealing surfaces into engagement. The sealant may be applied to the first sealing surface after applying the surface treatment to the joint of the first sealing surface. The sealant may be applied to the second sealing surface before, at the same time as, or after applying the surface treatment to the joint of the first sealing surface.

The second casing portion may be assembled from at least two components. The second sealing surface may comprise a joint between the components of the second casing portion. The process may comprise a step of applying a surface treatment to the joint of the second sealing surface using the automated treatment apparatus.

The components of the first casing portion may be fabricated from a plurality of materials. The components of the second casing portion may be fabricated from a plurality of materials.

The process may comprise moving an applicator of the automated treatment apparatus between a first position where the applicator is remote from the first sealing surface and a second position where the applicator is engaged against the joint of the first sealing surface. The process may comprise moving an applicator of the automated treatment apparatus between a first position where the applicator is remote from the second sealing surface and a second position where the applicator is engaged against the joint of the second sealing surface.

The process may comprise drying the first sealing surface and/or the second sealing surface for a predetermined time following the application of the surface treatment. The first sealing surface and/or the second sealing surface may be dried using a forced drying process.

The process may comprise priming the applicator during the automated sealing process with a surface treatment fluid. The process may comprise pumping the surface treatment fluid between a fluid reservoir and the applicator during the automated sealing process. The process may comprise priming the applicator with a predetermined volume of the surface treatment fluid. The applicator may be primed periodically, for example between each application of the surface treatment fluid. The applicator may be primed continuously, for example the surface treatment fluid may flow at a continuous rate to the applicator.

The process may comprise determining the configuration, for example the shape, size and/or identification, of the first and/or second casing portions. The process may comprise determining the configuration, for example the location, of the joint of the first sealing surface and/or the joint of the second sealing surface.

The process may comprise adjusting the configuration of the automated treatment apparatus depending upon the determined configuration of the first and/or second casing portions. The process may comprise adjusting the configuration of the automated treatment apparatus depending upon the determined location of the joint of the first sealing surface and/or the joint of the second sealing surface.

The process may comprise selecting an applicator from a plurality of different applicators depending upon the determined configuration of the first and/or second casing portions. The process may comprise selecting an applicator from a plurality of different applicators depending upon the determined location of the joint of the first sealing surface and/or the joint of the second sealing surface.

The process may comprise recording the application of the surface treatment to the joint, for example using a controller of the automated treatment apparatus.

According to another aspect of the present invention there is provided an automated treatment apparatus for sealing a casing, for example an engine casing. The automated treatment apparatus may be configured to seal the interface between discrete portions of the engine casing. The casing comprises a first casing portion having a first sealing surface. The casing comprises a second casing portion having a second sealing surface. The first sealing surface and the second sealing surface are configured to engage each other. The first casing portion is assembled from at least two components. The first sealing surface comprises a joint between the components of the first casing portion. The automated surface treatment apparatus is configured to apply a surface treatment to the joint of the first sealing surface. The automated treatment apparatus may comprise a sealing apparatus configured to apply a sealant to the first sealing surface and/or the second sealing surface.

The automated treatment apparatus may comprise an applicator configured to apply a surface treatment to the joint of the first sealing surface and/or a joint of the second sealing surface. The applicator may be movable between a first position where the applicator is remote from the first sealing surface and a second position where the applicator is adjacent to, for example engages, the joint of the first sealing surface. The automated treatment apparatus may comprise an applicator movable between a first position where the applicator is remote from the second sealing surface and a second position where the applicator is adjacent to, for example engages, the joint of the second sealing surface.

The applicator may be shaped to engage the joint of the first sealing surface. The applicator may be shaped to engage the joint of the second sealing surface. The applicator may be shaped so as to apply the surface treatment to a portion of the first sealing surface and/or a portion of the second sealing surface. The portion of the sealing surface may be adjacent to the joint. The applicator may be shaped so as to engage the sealing surface without engaging any other surface of the casing.

The applicator may be configured to transfer a surface treatment fluid to the joint upon being brought into contact with the sealing surface. The applicator may comprise a porous element in fluidic connection with a reservoir of surface treatment fluid. The automated surface treatment apparatus may comprise a priming system configured to transfer the surface treatment fluid to the applicator during the automated sealing process. The priming system may comprise a pump configured to pump the surface treatment fluid from the reservoir. The reservoir may be pressurised.

The automated surface treatment apparatus may comprise a plurality of applicators. Each of the applicators may be configured to engage a different joint of the first and/or second sealing surfaces.

The automated surface treatment apparatus may comprise a forced drying system configured to dry the first and/or second sealing surface.

The automated surface treatment apparatus may comprise one or more sensors configured to determine the configuration of the first casing portion and/or the second casing portion. The automated surface treatment apparatus may comprise one or more sensors configured to determine the location of the joint on the first sealing surface and/or the joint on the second sealing surface.

The automated surface treatment apparatus may comprise a controller configured to record the application of the surface treatment to the joint, or example as a means of tracking the application of the surface treatment to the joint.

There may be provided an automated production line comprising one or more of the automated treatment apparatuses described above.

The surface treatment may be a conversion coating, for example Bonderite® or any other surface treatment that improves the adhesion of the sealant to the sealing surface.

The invention also provides software, such as a computer program or a computer program product for carrying out any of the processes described herein, and a computer readable medium having stored thereon a program for carrying out any of the processes described herein. A computer program embodying the invention may be stored on a computer-readable medium, or it could, for example, be in the form of a signal such as a downloadable data signal provided from an Internet website, or it could be in any other form.

To avoid unnecessary duplication of effort and repetition of text in the specification, certain features are described in relation to only one or several aspects or arrangements of the invention. However, it is to be understood that, where it is technically possible, features described in relation to any aspect or arrangement of the invention may also be used with any other aspect or arrangement of the invention.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1:
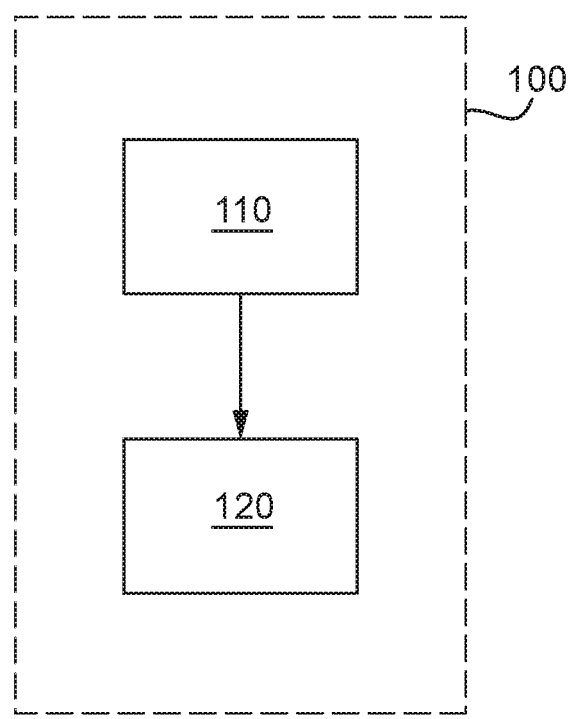
FIG. 1 shows an automated sealing process.
Figure 2:
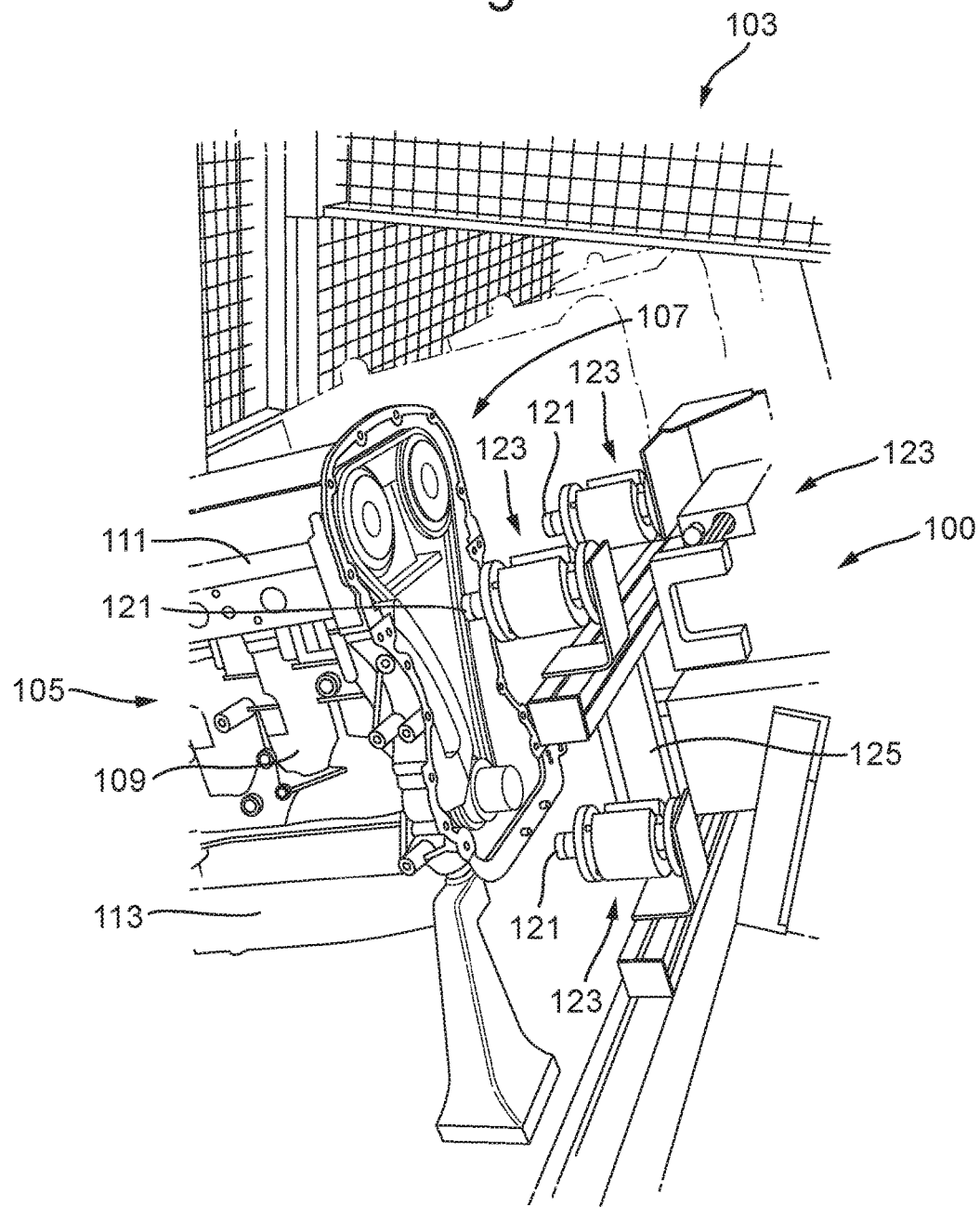
FIG. 2 shows an automated treatment apparatus and a plurality of engines on a production line.

FIGS. 1 and 2 show an automated sealing process 100 and an automated treatment apparatus 101. In the arrangement shown in FIG. 2, the automated treatment apparatus 101 is installed on an automotive production line 103 for the production of engines 105, and is configured to apply a surface treatment to a sealing surface of an engine casing. However, the automated treatment apparatus 101 may be installed on any appropriate type of automated process, and may be used to treat one or more surfaces of any appropriate component.

In the arrangement shown in FIGS. 2 to 5, the engine casing comprises a first casing portion 107 that is assembled from a number of different components. For example, the first casing portion 107 may include a cylinder block 109, a cylinder head 111 and a sump casing 113 in an assembled configuration. The first casing portion 107 may however be assembled from any appropriate number of components, depending on the configuration of the engine.

The first casing portion 107 has a first sealing surface 115 that is configured to engage another sealing surface. In the arrangement shown in FIGS. 2 to 5, the first sealing surface 115 extends around the perimeter of the first casing portion 107, therein defining an opening in the first casing portion 107. The engine 105 may comprise a second casing portion (not shown), for example an engine cover, that is configured to close the opening in the first casing portion 107. The second casing portion may cover the whole of the opening in the first casing portion 107, or may cover a portion of the opening. The second casing portion (not shown) may comprise a second sealing surface configured to engage the first sealing surface of the first casing portion 107 such that the second casing portion covers the open end of the first casing portion 107.

In the arrangement shown in FIGS. 2 to 5, the cylinder block 109, the cylinder head 111 and the sump casing 113 each has a free end face 115a, 115b, 115c that align to form the first sealing surface 115 of the engine casing 107 in an assembled configuration. In this manner, the first sealing surface 115 comprises a number of discrete portions 115a, 115b, 115c having a number of joints 117 there between. For example, the first sealing surface 115 of the engine casing 107 has two joints located at the top of the engine between the end face 115a of the cylinder block 109 and the end face 115b of the cylinder head 111, and has two joints 117 located at the bottom of the engine between the end face 115a of the cylinder block 109 and the end face 115c of the sump casing 113.

As a result of the operational requirements of the different components of the first casing portion 107, each of the cylinder block 109, the cylinder head 111 and the sump casing 113 may be fabricated from a different material, for example the cylinder block 109 may fabricated from cast iron and both the cylinder head 111 and the sump casing 113 may be fabricated from aluminum. The second casing portion may be fabricated from a similar material to either the cylinder block 109 or the cylinder head 111 and the sump casing 113, or may be fabricated from different material, for example a different alloy of a polymeric material.

A known process for sealing the interface between the first sealing surface 115 and the second sealing surface is to use a sealant, such as RTV silicone. The sealant may be applied to at least one of the first sealing surface 115 and the second sealing surface prior to assembly of the second casing portion to the first casing portion 107. During operation of the engine 105, heat is generated, which causes the components of the engine 105 to expand. As a result, a shear stress is applied to the sealant, which may cause the sealant to de-bond from either or both of the first sealing surface 115 and the second sealing surface, which may result in fluid leaking from the engine casing.

The joints 117 in the first sealing surface 115 may be particularly prone to leaking. For example, as the components of the first casing portion 107 are fabricated from different materials, each of the components may expand by different amounts as a result of differing coefficients of thermal expansion between the different materials. In certain arrangements, there will be a shear stress differential in the sealant across the joint as a results of one material expanding by a greater amount than the other material. Such a setup is common in the manufacture of engines. For example, an engine casing may comprise a "T-joint" between three components of the engine casing. The present disclosure may be particularly useful in providing a reliable seal to the T-joint of an engine casing.

In some arrangements, the first sealing surface 115 may comprise a joint between two components of similar materials. Each of the components may, however, be of a different thickness at the joint, which causes one of the components to expand at a different rate to the other the component.

Where two different materials form the joint 117 in the first sealing surface 115, the adhesive bond strength between each of the materials and the sealant will be different, owing to the inherent characteristics of materials. For example, the adhesive bond strength between cast iron and RVT silicone may be less than that between aluminum and RVT silicone, depending on the configuration, e.g. surface roughness and/ or contamination, of the respective sealing surfaces 115a, 115b, 115c. As a result, the shear stress generated in the sealant acts to de-bond the sealant from the first sealing surface 115, as the components either side of the joint 117 expand during operation of the engine 105. It is desirable therefore to increase the strength of the adhesive bond of the sealant to the first sealing surface 115 and/or the second sealing surface. In particular, it is desirable to increase the strength of the adhesive bond of the sealant to the sealing surfaces 115a, 115b, 115c either side of the joint 117. Surface treatment processes can, however, be costly in terms of time and money, and may be particularly difficult to implement into existing automated production processes.

FIG. 1 illustrates the automated sealing process 100 for sealing an interface between the first engine casing portion 107 and the second engine casing portion. The process 100 comprises a step 110 of applying a surface treatment to the joint 117 of the first sealing surface 115 using the automated treatment apparatus 101. The process comprises the step 120 of applying the sealant to the first sealing surface 115 and/or the second sealing surface after the application of the surface treatment to the joint 117. The first and second sealing surfaces may then be brought into engagement so as to form a seal between the first engine casing portion 107 and the second engine casing portion.

The automated treatment apparatus 101 comprises an applicator 121 configured to engage the joint 117. The applicator 121 may be shaped to only apply the surface treatment to a portion of the first sealing surface 115, for example to a targeted region of the first sealing surface 115 which comprises the joint 117. The applicator 121 may be shaped to apply the surface treatment to one or more portions of the respective sealing surfaces 115a, 115b, 115c that are adjacent to the joint 117. In other words, the step 110 of applying the surface treatment comprises engaging the applicator against a portion of the first sealing surface 115 that is most prone to leaking. In this manner, the surface treatment is not applied to the entire surface of the first sealing surface 115. Indeed, the targeted application means that the step 110 may be completed in a relatively short period and may be easily incorporated into an existing production line process without disrupting the overall cycle time of the production line 103.

The surface treatment may be a conversion coating configured to form a surface layer on the first sealing surface 115. The surface layer may be created by chemical reaction between the first sealing surface 115 and a surface treatment fluid, for example a chemical solution. As such, the applicator may be configured to transfer fluid from a reservoir of surface treatment fluid to the joint 117 of the first sealing surface 115 upon being brought into contact with the first sealing surface 115. The surface layer may, however, be created using any appropriate conversion coating technique.

The applicator 121 may be movable between a first position, where the applicator 121 is remote from the first sealing surface 115, and a second position, where the applicator 121 is engaged against the joint 117 of the first sealing surface 115. The automated treatment apparatus 101 may comprise one or more actuators 123 configured to move the applicator 121 relative to the first sealing surface 115.

Figure 3:
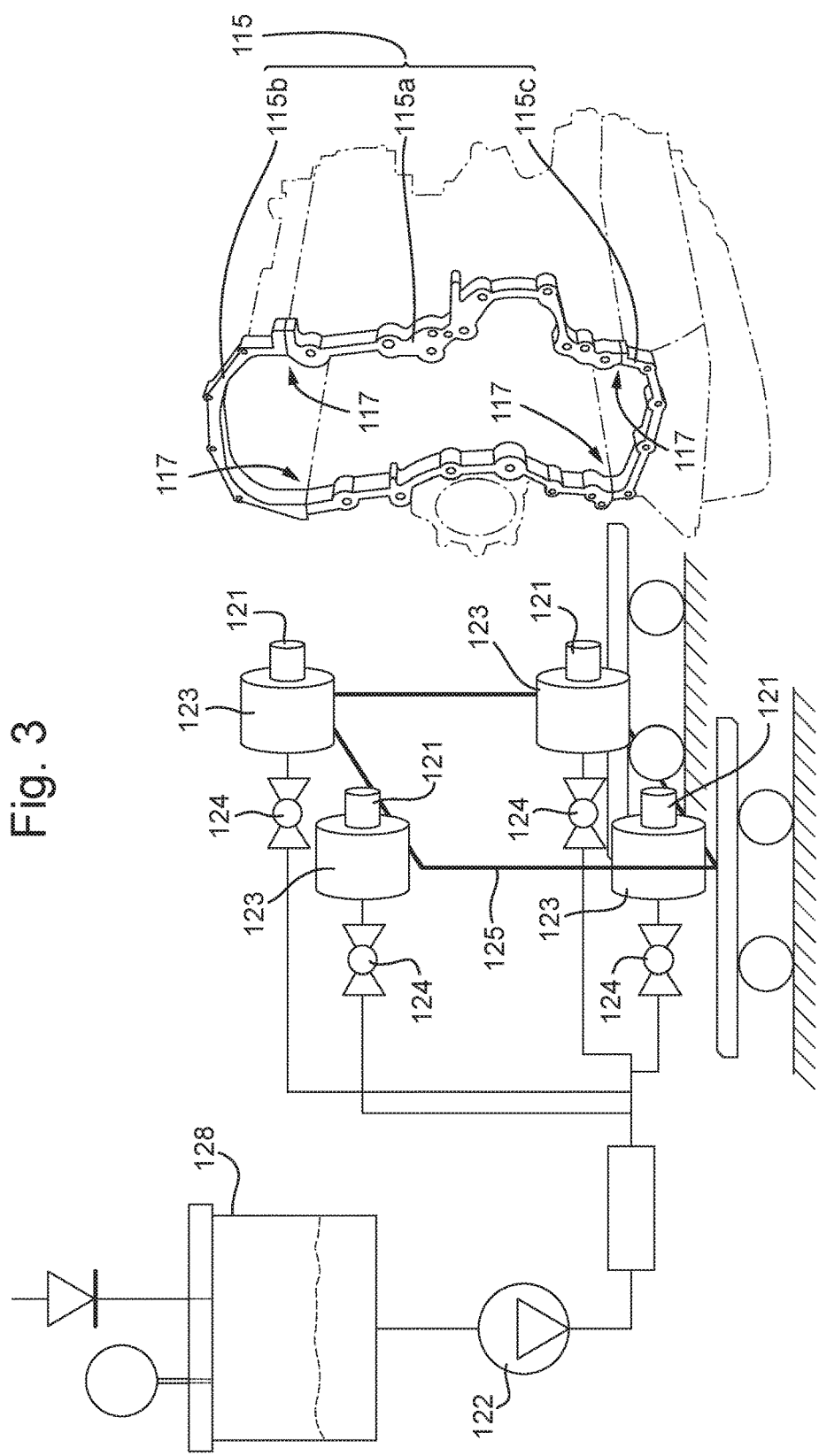
FIG. 3 shows a schematic of a automated treatment apparatus and an engine casing.

In the arrangement show in FIG. 3, the automated treatment apparatus 101 comprises four applicators 121, each of which is configured to engage a respective joint 117 of the first sealing surface 115. The applicators 121 may be configured to move simultaneously, or may be timed individually depending on the desired application of the surface treatment. In the arrangement of FIG. 3, it is advantageous to move all the applicators 121 at the same time so that the time taken to apply the surface treatment fluid to all of the joints 117 is minimised.

The actuators 123 are linear actuators that are configured to move the applicators 121 towards and away from the first sealing surface 115. However, the actuators 123 may be any type of actuators configured to move the applicators 121. For example, the actuators 123 may be robotic arms configured to move the applicators 121 in any number of degrees of freedom, as required.

In the arrangement shown in FIG. 3, the applicators 121 are mounted on a jig 125 and are spaced apart from one another so that the each applicator 121 lines up with a respective joint 117 of the first sealing surface 115 when the engine 105 is in an appropriate position on the production line 103. Each applicator 121 is coupled to a respective actuator 123 so that each applicator 121 may move independently. However, in an alternative arrangement, the applicators 121 may be fixed relative to the jig 125, and/or the jig 125 may be coupled to one or more actuators 123 that are configured to move the jig 125 relative to the first sealing surface 115.

Figure 4:
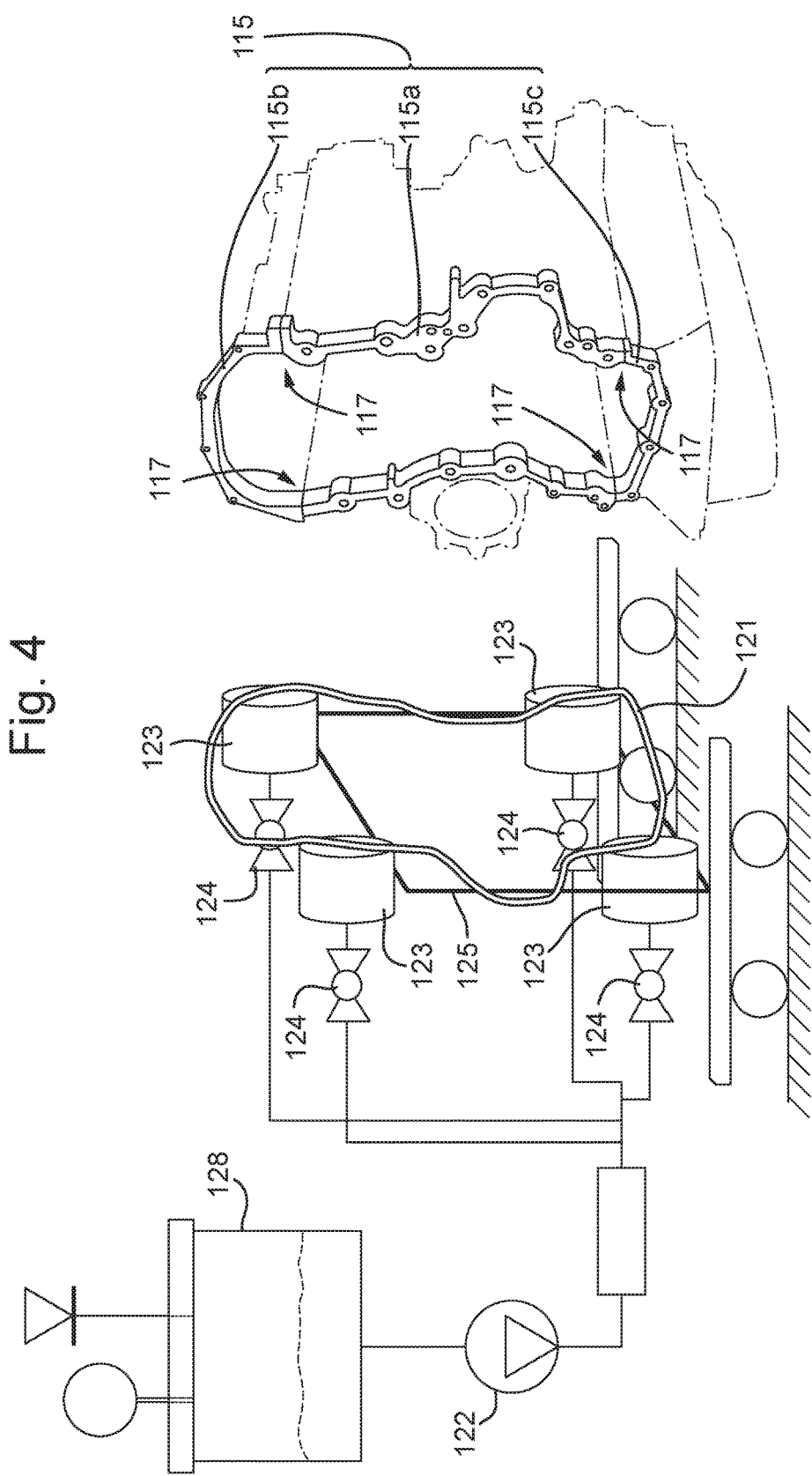
FIG. 4 shows a schematic of another automated treatment apparatus and an engine casing.

In the arrangement shown in FIG. 4, the automated treatment apparatus 101 comprises a single applicator 121 that is shaped to engage substantially the first sealing surface 115, for example the applicator 121 may be a continuous loop shaped to match the first sealing surface 115. The applicator 121 is fixed relative to the jig 125 and the jig 125 is configured to move linearly towards and away from the engine 105 so as to apply the surface treatment in a single motion around the entire perimeter of the opening in the first portion of the engine casing 107.

Figure 5:
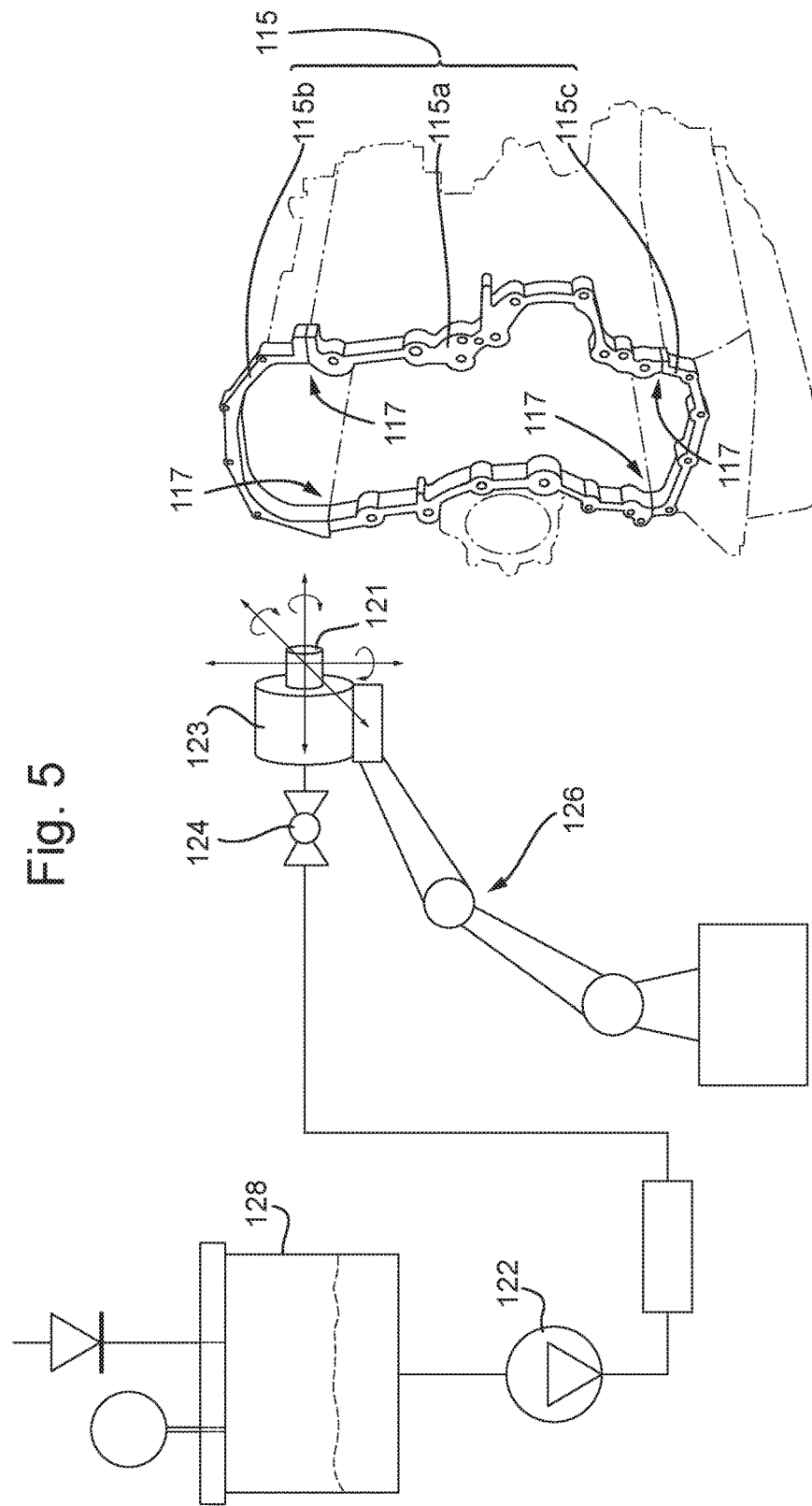
FIG. 5 shows a schematic of a further automated treatment apparatus and an engine casing.

In the arrangement shown in FIG. 5, the automated treatment apparatus 101 comprises a single applicator 121 that is coupled to a robotic arm 126. The robotic arm 126 is configured to move in all degrees of freedom, for example in each translational and rotational degree of freedom. The robotic arm 126 is configured to move the applicator 121 relative to the first sealing surface 115. For example, the robotic arm 126 may be configured to position the applicator 121 near to the joint 117 of the first sealing surface 115 and move the applicator 121 in a linear manner to engage, and disengage, the joint 117. Additionally or alternatively, the robotic arm 126 may be configured engage the first sealing surface 115 and wipe the surface treatment fluid over at least a portion of the first sealing surface 115.

In the arrangement sown in FIG. 5, and each of the above arrangements, the first sealing surface 115 comprises a planar surface. However, in an alternative arrangement, not shown, the first sealing surface 115 and/or the second sealing surface may be of any appropriate form. In such arrangements, the robotic arm 126 may be advantageous as it can articulate so as to apply the surface treatment to areas of the first sealing surface 115 that have restricted access, for example regions of the first sealing surface 115 that may be located behind another portion of the engine casing 107 and/or another component of the engine 105.

Where the production line 103 is used for different types of engines, the automated treatment apparatus 101 may be configured to detect the type of engine to which the surface treatment is applied. For example, a first engine type may comprise a sealing surface having a first number of joints, and a second engine type may comprise a another sealing surface having a different number of joints. Additionally or alternatively, the joints of the first engine type may be positioned differently to the joints of the second engine type. As such, the automated treatment apparatus 101 may be configured to adjust the position of the applicators 121 depending upon the configuration of the sealing surface of the engine. The process 100 may, therefore, comprise the step of determining the configuration of the engine, and the step of adjusting the configuration of the automated treatment apparatus 101 depending upon the determined engine type.

The applicators 121 may be specifically shaped to engage the joints 117 of the first sealing surface 115. For example, the applicators 121 may be shaped to conform with the first sealing surface 115 upon engagement of the applicators 121 with the joints 117. The applicators 121 may comprise a resilient element that enables an engagement surface of the applicator 121 to conform to at least a portion of the first sealing surface 115.

The automated treatment apparatus 101 may comprise a number of different types of applicators 121 configured for use on different engines. For example, a joint of a first engine type may be different in size and/or shape to a joint of a second engine type. As a result, a single applicator may not be appropriately configured to apply the surface treatment to joints of the first and the second engine types. The process 100 may, therefore, comprise a step of selecting an appropriate applicator from a plurality of different applicators depending upon the determined engine type.

The automated treatment apparatus 101 may comprise a priming system configured to prime the applicator 121 with the surface treatment fluid. For example, the applicator 121 may comprises a porous element that is in fluidic connection with a reservoir 128 of the surface treatment fluid. The porous element, for example a pad made from fabric or foam, may be configured to engage the joint 117 and transfer the surface treatment fluid to the first sealing surface 115. The porous element may be conformable to the first sealing surface 115 such that a predetermined amount of the surface treatment fluid is expelled from the pad upon engaging the first sealing surface 115. The amount of the surface treatment fluid is expelled may be a function of the force, or pressure, applied to the pad. For example, the pad may be configured to hold a predetermined volume of surface treatment fluid. Applying a first level of force may cause the pad to compress by a first amount, and expel a first volume of surface treatment fluid from the pad.

The priming system may be configured to transfer periodically the surface treatment fluid from the reservoir 128 to the porous element of the applicator 121, for example using one or more pumps 122 and/or one or more valves 124 configured to control the flow of the surface treatment fluid. The pump may be a displacement type pump configured to deliver a predetermined volume of the surface treatment fluid to the applicator 121. However, the pump may be configured to deliver a constant flow of the surface treatment fluid to the applicator 121. Additionally or alternatively, the reservoir 128 may be pressurised so as to drive a flow of the surface treatment fluid to the applicator 121. In this manner, the automated treatment apparatus 101 is configured such that the applicator 121 remains primed for use during the automated sealing process 100, and there is no downtime of the production line 103 whist the applicators 121 are primed manually. Further, as the surface treatment fluid is confined to the fluid reservoir 128, the applicator 121 and any associated flow lines, the risk of the surface treatment fluid contaminating the surrounding environment is mitigated. This may be of particular advantage over known application processes, such as dipping, spraying and wiping, as the surface treatment fluid may be a hazardous substance. As a result of the surface treatment fluid being controlled in such a manner, there is no airborne surface treatment fluid, contrary to spraying and dipping application processes. Spraying and dipping application processes are less controlled and may cause treatment of surfaces where treatment may not be desirable, such as the surface of a cylinder bore. Further, when dipping processes are used, the fluid reservoir in which the component is dipped may become contaminated over time. The present disclosure may therefore reduce the amount of waste surface treatment fluid during the application process.

The automated sealing process 100 may comprise one or more steps of priming the applicator 121 with the surface treatment fluid. For example, process 100 may comprise a step of priming the applicator 121 in between each application, or a predetermined number of applications, of the surface treatment fluid to the joint 117.

Following the application of the surface treatment, the process 100 may comprise a step of drying at least a portion of the first sealing surface 115. For example, the step of drying the first sealing surface 115 may comprise drying the first sealing surface 115 for a predetermined time, which may be selected depending upon the flash time of the applied surface treatment. The drying may be natural air drying in which the first sealing surface 115 is dried with unheated and un-forced air. The drying may, however, be completed using one or more forced drying techniques, for example convective/hot air drying, contact drying, infrared drying, ultraviolet drying, and/or any other appropriate type of drying process. The drying step may be performed in between the application of the surface treatment and the application of the sealant. In some cases, depending on the type of surface treatment, it may be necessary to dry the surface treatment before applying the sealant. It may be advantageous, therefore, to include a forced drying step in order to reduce the cycle time of the automated sealing process 100 in the production line 103.

The automated treatment apparatus 101 may comprise one or more forced drying systems. The forced drying system may be configured to dry the joints 117 of the first sealing surface 115, for example the forced drying system may target only the portion of the first sealing surface 115 to which the surface treatment has been applied.

The surface treatment apparatus 101 may comprise one or more controllers configured to carry out any of the above steps of the automated sealing process 100. For example, the controller may be configured to control the adjustment of the applicators 121 upon determining the type of engine that in on the production line 103. The controller may also be configured to record the application of the surface treatment to the joint 117, together with the type of engine. The engine may have a unique engine identifier, for example a barcode, which allows the application of the surface treatment to be recorded and traced so that any faults with the engine, for example leaks, during its operational life may be cross-checked against the application of the surface treatment to the joints 117 of the first sealing surface 115.

It will be appreciated by those skilled in the art that although the invention has been described by way of example with reference to one or more arrangements, it is not limited to the disclosed arrangements and that alternative arrangements could be constructed without departing from the scope of the invention as defined by the appended claims.

What is claimed:

1. An automated sealing process for sealing a casing, the casing comprising a first casing portion having a first sealing surface, and a second casing portion having a second sealing surface configured to engage the first sealing surface, the first casing portion being assembled from at least two components such that the first sealing surface comprises a joint between the components, the process comprising:

applying a surface treatment to the joint of the first sealing surface using an automated treatment apparatus; and applying a sealant to at least one of the first sealing surface and the second sealing surface prior to bringing the first and second sealing surfaces into engagement.

2. An automated sealing process according to claim 1, wherein the components of the first casing portion are fabricated from different materials.

3. An automated sealing process according to claim 1, the process further comprising moving an applicator of the automated treatment apparatus between a first position where the applicator is remote from the first sealing surface and a second position where the applicator is engaged against the joint of the first sealing surface.

4. An automated sealing process according to claim 3, the process further comprising drying the first sealing surface for a predetermined time following the application of the surface treatment.

5. An automated sealing process according to claim 4, wherein the first sealing surface is dried using a forced drying process.

6. An automated sealing process according to claim 5, the process further comprising priming the applicator periodically during the automated sealing process with a surface treatment fluid.

7. An automated sealing process according to claim 6, the process further comprising pumping the surface treatment fluid from a fluid reservoir to the applicator during the automated sealing process.

8. An automated sealing process according to claim 7, the process further comprising determining at least one of the configuration of the first casing portion and the location of the joint on the first sealing surface.

9. An automated sealing process according to claim 8, the process further comprising adjusting the configuration of the automated treatment apparatus depending upon at least one of the determined configuration of the first casing portion and the determined location of the joint of the first sealing surface.

10. An automated sealing process according to claim 9, the process further comprising selecting an applicator from a plurality of different applicators depending upon at least one of the determined configuration of the first casing portion and the determined location of the joint of the first sealing surface.

11. An automated sealing process according to claim 10, the process further comprising recording the application of the surface treatment to the joint using a controller of the automated treatment apparatus.

12. An automated treatment apparatus for sealing a casing, the casing comprising a first casing portion having a first sealing surface, and a second casing portion having a second sealing surface configured to engage the first sealing surface, the first casing portion being assembled from at least two components such that the first sealing surface comprises a joint between the components, the automated surface treatment apparatus being configured to apply a surface treatment to the joint of the first sealing surface.

13. An automated treatment apparatus according to claim 12, wherein the components of the first casing portion are fabricated from different materials.

14. An automated treatment apparatus according to claim 13, the automated treatment apparatus comprising an applicator movable between a first position where the applicator is remote from the first sealing surface and a second position where the applicator is engaged against the joint of the first sealing surface.

15. An automated treatment apparatus according to claim 14, wherein the applicator is shaped to engage the joint of the first sealing surface.

16. An automated treatment apparatus according to claim 15, wherein the applicator is configured to transfer a surface treatment fluid to the joint of the first sealing surface upon being brought into contact with the first sealing surface.

17. An automated treatment apparatus according to claim 16, wherein the applicator comprises a porous element in fluidic communication with a reservoir of surface treatment fluid.

18. An automated treatment apparatus according to claim 17, the automated surface treatment apparatus comprising a priming system configured to transfer the surface treatment fluid to the applicator during the automated sealing process.

19. An automated treatment apparatus according to claim 18, wherein the priming system comprises a pump configured to pump the surface treatment fluid from the reservoir.

20. An automated treatment apparatus according to claim 19, the automated surface treatment apparatus comprising a plurality of applicators each configured to engage a different joint of the first sealing surface.

21. An automated treatment apparatus according to claim 20, the automated surface treatment apparatus comprising a forced drying system configured to dry the first sealing surface.

22. An automated treatment apparatus according to claim 21, the automated surface treatment apparatus comprising one or more sensors configured to determine at least one of the configuration of the first casing portion and the location of the joint on the first sealing surface.

23. An automated treatment apparatus according to claim 22, the automated surface treatment apparatus comprising a controller configured to record the application of the surface treatment to the joint.

24. An engine casing comprising:
 a first portion having a first sealing surface and assembled from at least two components, the first sealing surface comprising a joint between the components;
 a second portion having a second sealing surface engaging the first sealing surface across the joint;
 a polymer sealant between the first and second sealing surfaces; and
 a conversion coating, applied to the joint, that improves the adhesion of the first sealing surface to the sealant.

* * * * *